(12) United States Patent
Liu

(10) Patent No.: US 11,928,942 B2
(45) Date of Patent: Mar. 12, 2024

(54) SYSTEMS AND METHODS FOR THEFT PREVENTION AND DETECTION

(71) Applicant: JFM International Corp., Miami, FL (US)

(72) Inventor: Yanwei Liu, Miami, FL (US)

( * ) Notice: Subject to any disclaimer, the term of this patent is extended or adjusted under 35 U.S.C. 154(b) by 0 days.

(21) Appl. No.: 17/297,434

(22) PCT Filed: Nov. 26, 2019

(86) PCT No.: PCT/US2019/063476
§ 371 (c)(1),
(2) Date: May 26, 2021

(87) PCT Pub. No.: WO2020/112920
PCT Pub. Date: Jun. 4, 2020

(65) Prior Publication Data
US 2022/0020254 A1    Jan. 20, 2022

Related U.S. Application Data

(60) Provisional application No. 62/771,184, filed on Nov. 26, 2018.

(51) Int. Cl.
| | |
|---|---|
| *G08B 13/196* | (2006.01) |
| *G06V 20/52* | (2022.01) |
| *G06V 40/20* | (2022.01) |
| *G08B 13/24* | (2006.01) |
| *H04N 7/18* | (2006.01) |

(52) U.S. Cl.
CPC ....... *G08B 13/19613* (2013.01); *G06V 20/52* (2022.01); *G06V 40/20* (2022.01); *G08B 13/2402* (2013.01); *G08B 13/246* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 8,570,375 B1 * | 10/2013 | Srinivasan | H04N 7/181 235/383 |
| 10,217,120 B1 * | 2/2019 | Shin | G06Q 30/0201 |
| 10,573,163 B1 * | 2/2020 | Benkreira | G07G 1/0036 |
| 2004/0164863 A1 * | 8/2004 | Fallin | G06Q 20/20 705/16 |
| 2007/0182818 A1 * | 8/2007 | Buehler | G08B 13/19641 348/143 |
| 2008/0308632 A1 * | 12/2008 | Fallin | G06Q 10/087 235/385 |
| 2009/0115849 A1 * | 5/2009 | Landers, Jr. | G08B 13/19613 348/E7.001 |

(Continued)

*Primary Examiner* — Ricky Chin
(74) *Attorney, Agent, or Firm* — Diana Mederos; Mederos Legal, PLLC

(57) ABSTRACT

A system and method for premises theft prevention and detection. A system comprises a media capture device, a target area and target object at a workstation, and operably configured code in non-transitory computer readably storage media. A system recognizes a theft or misappropriation and can notify a business owner or police. The system is powered by machine-learning algorithms that progressively improve accuracy and precision in theft detection.

1 Claim, 5 Drawing Sheets

(56) References Cited

U.S. PATENT DOCUMENTS

| | | | |
|---|---|---|---|
| 2010/0059589 A1* | 3/2010 | Goncalves | G08B 13/248 382/218 |
| 2012/0169879 A1* | 7/2012 | Libal | G08B 13/194 706/54 |
| 2014/0064566 A1* | 3/2014 | Shreve | G06V 40/20 382/107 |
| 2015/0213308 A1* | 7/2015 | Mackowiak | G06V 40/20 382/103 |
| 2016/0196485 A1* | 7/2016 | Patterson | G06K 19/0723 340/572.1 |
| 2016/0286171 A1* | 9/2016 | Cheng | H04N 7/183 |
| 2016/0350738 A1* | 12/2016 | Crooks | G06V 20/95 |
| 2016/0379145 A1* | 12/2016 | Valentino, III | G06Q 10/105 705/7.13 |
| 2021/0020008 A1* | 1/2021 | Deutsch | G08B 13/19613 |
| 2021/0304550 A1* | 9/2021 | Kelly | G06T 7/10 |
| 2022/0020254 A1* | 1/2022 | Liu | G08B 25/08 |

\* cited by examiner

SYSTEMS AND METHODS FOR THEFT PREVENTION AND DETECTION

CROSS REFERENCE TO RELATED APPLICATION

This application claims the benefit of U.S. provisional application No. 62/771,184, entitled SYSTEM AND METHODS FOR THEFT PREVENTION AND DETECTION, filed Nov. 26, 2018, the contents of which are hereby incorporated by reference.

FIELD OF THE DISCLOSURE

The present disclosure relates to systems and methods for theft prevention and detection. More specifically, the disclosure pertains to a premises management system having video surveillance and recording coupled with computer architecture and machine-learning programs for individual and target item detection and tracking.

BACKGROUND OF THE DISCLOSURE

Business owners lose money each year from employee misappropriation or theft of goods from a store or of money from cash registers and safes. It is not practical for business owners to be present at the place of business all the time. Therefore, owners train and rely on employees to manage and take care of the business needs.

Traditionally, security cameras are used to monitor and record activity in stores. Sometimes, a plurality of security cameras could be strategically placed for a comprehensive watch and view of the business interior and exterior premises. Security cameras could also be strategically placed for a closer view of points of interest such as safes, cash registers, and lockers containing high-value goods.

Security cameras may be effective at deterring burglars and thieves who may enter the business premises. Security and surveillance systems may also aid in identifying thieves and burglars. Security camera systems, however, are not effective deterrents for those within a business organization who may not initially be a suspect in a theft incident. Traditional methods require a person to comb through hours of video footage, if recorded, to identify a theft or misappropriation occurrence. Employees are just as likely to be culprits in loss of inventory goods and money theft and misappropriation as those outside the business. Employees, and even business partners in some instances, may know the security camera systems and how to bypass or avoid surveillance in order to steal goods or money. Each time an employee handles money, an opportunity for misappropriation or theft arises.

Traditional surveillance systems may record multimedia files; however, surveillance systems are not able to immediately and in real time detect a theft or misappropriation and instead focus on identification of persons who enter and leave the premises and at what time. Camera and surveillance systems may be pointed to a target of interest such as a cash register. The system recordings will show who accessed the cash register and at what time. No system can presently identify, track, and account for goods and money. Furthermore, no system can presently, upon detection of theft or misappropriation, notify the business owner or police.

SUMMARY OF THE DISCLOSURE

What is needed are systems and methods for theft prevention and detection. The system comprises at least one media capture device, a target, a computer program, parameters and algorithms, and data associated with target recognition, tracking, and reconciliation. The system uses parameters and algorithm configured sensors for triggering a notification of a theft or misappropriation based on multimedia recorded in a database where the computer program comprises operably configured code for detecting an instance of a theft or misappropriation.

For example, in a premises theft detection and prevention system, multimedia data is captured from at least one camera and transferred via the Internet to a computing device. The computing device generally contains a server, database, graphical user interface, operably configured software, and a monitor or display for data processing, rendering, and notification. Image processing techniques are progressively optimized over time via machine-learning algorithms used to detect a theft or misappropriation occurrence.

Generally, a premises management system of a defined area is implemented with a media capture device such as a camera and sensors to detect suspicious gestures, the data. The data are processed by a processor to identify the premises context for a defined area based at least in part on item presence or location, individual presence, and gestures. The data is processed to determine the items and the individuals associated with the context of the items, such as a cashier associated with opening and closing a cash register and handling money in a store. Suspicious gestures such as pocketing and hands under the table while the cash register is open are determined. The gesture suspicion indicates a theft or misappropriation. Based on a determination of theft or misappropriation, the computer system will execute an alert.

Permissions and confidence estimates may be used jointly or alone in the system algorithms. Multiple sensors and image capture devices can be used to increase data capture and produce greater confidence estimates. Buffers are initialized and are scanned for defined gesture types, permissions, and parameters to detect a suspicious gesture and trigger an alert to prevent and detect theft.

BRIEF DESCRIPTION OF THE DRAWINGS

The accompanying drawings that are incorporated in and constitute a part of this specification illustrate various embodiments of the disclosure. Together with the description, the drawings serve to explain the principles of the disclosure.

REFERENCE NUMERALS OF THE DRAWINGS

Figure 1:
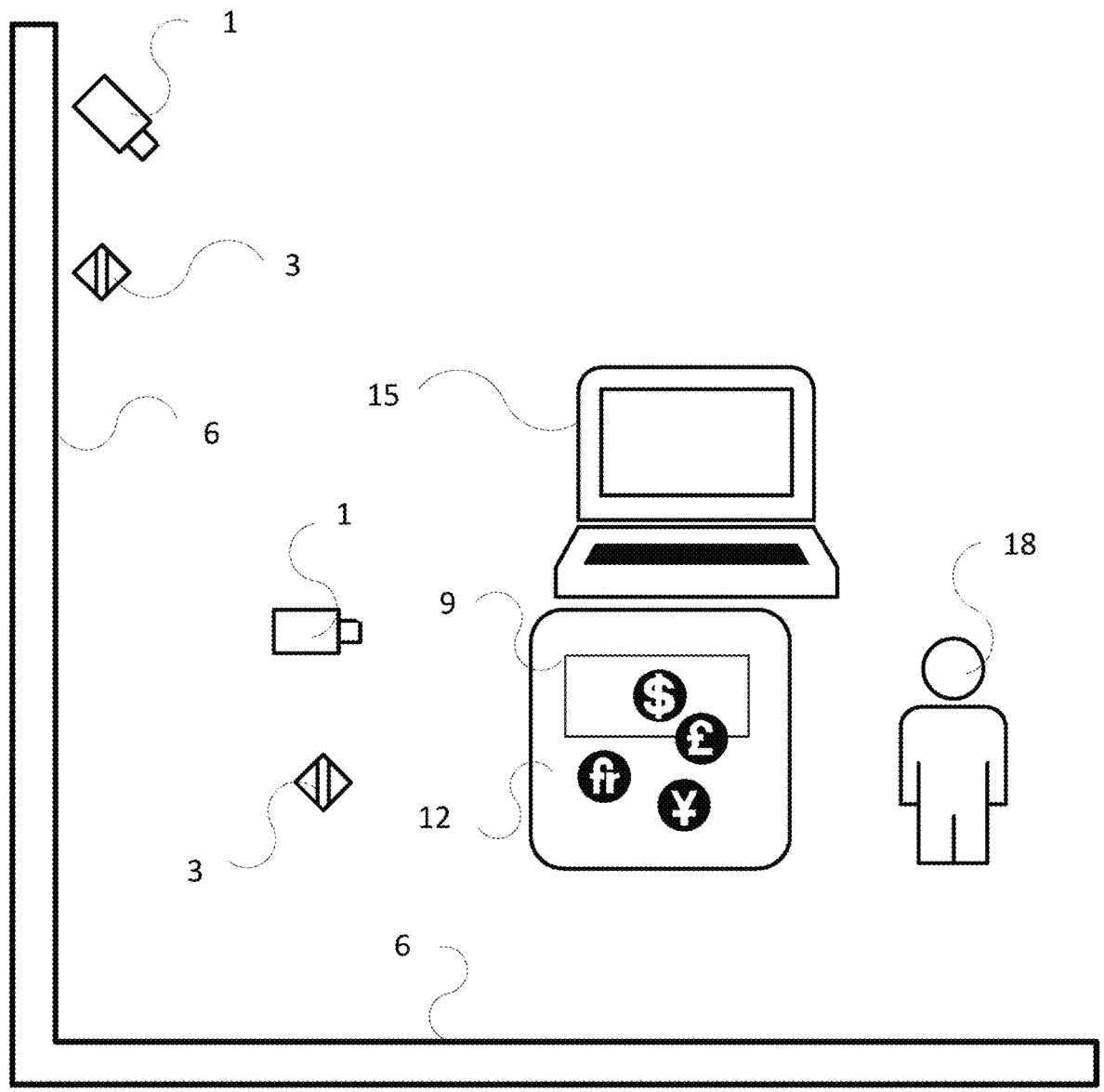
FIG. 1 shows a frontal view of an exemplary premises system configuration for theft prevention and detection.

1. Media capture device
3. Sensor
6. Premises
9. Target area
12. Target component
15. Workstation
18. Individual 21. Wireless connection
24. Server
27. Database
30. Computer
33. Processor
36. Initialization and fill buffer
39. Scan buffer for gesture
41. Confidence estimate production
44. Suspicious gesture detection
47. Alert
50. Buffer scan for unknown gesture
53. Confidence estimate for unknown gesture
56. Scan start
59. Content scan
62. Timing synchronization
65. Unknown image scan
68. Unknown image confidence estimate
71. Sensor data
74. Confidence estimate
77. Media capture estimate update
80. Target component detection
81 Increased confidence estimate
86. Update target area and target component count
89. Suspicion
92. Alert

DETAILED DESCRIPTION

The present disclosure provides generally for premises theft prevention and detection. The system comprises at least one media capture device, a target, a computer program, parameters and algorithms, and data associated with target recognition, tracking, and reconciliation.

A gesture recognition algorithm utilizes various parameters for direction, velocity, speed, and frequency and may be relative to a target item or area. Context of the target item or area may be considered for progressive machine learning patterns.

A sensor classification algorithm utilizes various parameters for density, volume, weight, shape, motion, and target area environmental conditions and changes thereof.

Generally, a system for real-time automatic adaptive recognition and counting may comprise a processor configured to execute designated commands, a server, a bus, memory coupled to a processor for storing instructions related to verification algorithms and video processing and adjustment, data storage, a network, and operably configured verification algorithm software. Generally, the methods for implementing a system for automatic adaptive recognition and counting comprise mounting a media capture device parallel, diagonally, or perpendicularly to a target area; capturing real-time multimedia; processing real-time multimedia; producing a confidence estimate according to sensor data; and initializing a notification.

The exemplary systems and methods are applicable in various industries such as commercial wholesale, consumer retail, restaurant and dining services, recreation and arcades, municipal services and facilities, and banking and exchange services. For example, gas stations and food stands are common businesses that often deal in cash transactions as well as inventor management of food goods. Employees rather than business owners may work as a cashier or as a line cook. The system described in the disclosure provides a way for business owners to remotely and passively account for inventory and cash and identify theft or likelihood of theft or misappropriation of inventory.

The system provides for inventory and money theft or misappropriation based on gesture recognition patterns. Cumulative image processing coupled with machine learning via algorithm parameters and optimization allows system detection of anomalies indicating likely theft or misappropriation.

In the following sections, detailed descriptions of examples and methods of the disclosure will be given. The description of both preferred and alternative examples are exemplary only, and it is understood that to those skilled in the art that variations, modifications, and alterations may be apparent. It is therefore to be understood that the examples do not limit the broadness of the aspects of the underlying disclosure as defined by the claims.

DETAILED DESCRIPTIONS OF THE DRAWINGS

Referring now to FIG. 1, an exemplary premises system for theft prevention and detection is illustrated. Exemplary systems comprise at least one camera, at least one sensor, and at least one target area in the premises. Outside of the premises, the system further comprises data captured from the cameras and sensors, transmission of the data, and processing of the data as illustrated with the hardware and network architecture in FIG. 2. Data may be processed on-site or remotely.

Exemplary cameras may have sensors integrated therewith or may be coupled to separate sensors via a wired or wireless connection. The cameras comprise image optics, image sensors, and processors for capturing multimedia such as still images, sound, and video. The cameras may have on-board storage or may transmit the captured multimedia to a separate server, processor, or storage via a wired or wireless Internet connection. The cameras and sensors may be integrated as shown in FIG. 1 or may be separate from each other.

A target area may be an area or object of interest that will have surveillance. For example, a cash register or point-of-sale system may be a target area. A target area is typically used, operated, or manipulated by a human individual. At least, one camera and sensor may be positioned orthogonally, perpendicularly, above, below, beside, or on the target area. The camera and sensor will preferably focus on areas of human interaction with the target area and target components or items therein such as currency or other valuables.

Figure 2:
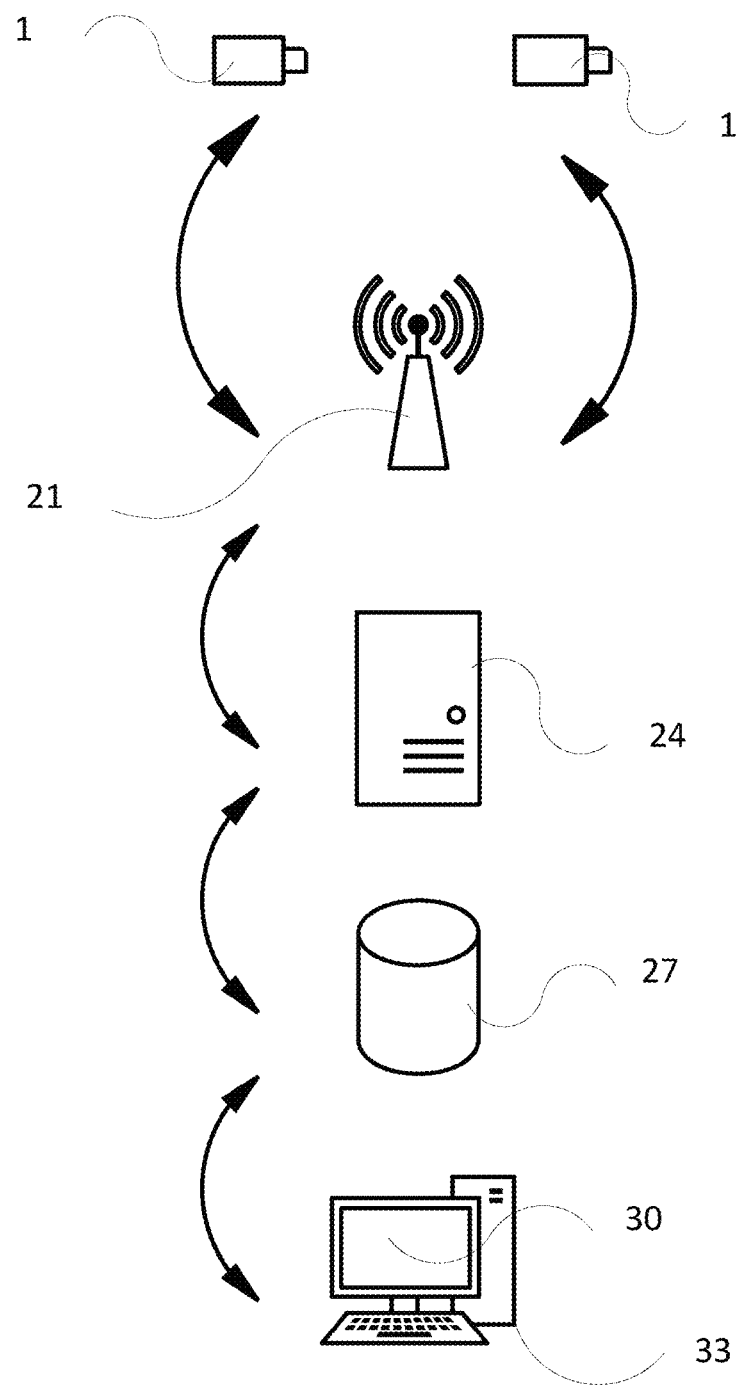
FIG. 2 shows a diagram of an exemplary hardware architecture system for theft prevention and detection.

Referring now to FIG. 2, an exemplary hardware architecture system for theft prevention and detection is illustrated. In some embodiments, a system may comprise at least one camera and at least one sensor as described and shown in FIG. 1, a network with Internet connection that may be wired or wireless, a server with a processor, a database, end-user content access point, and notifications.

Multimedia and target area data are captured on the cameras and sensors and may undergo pre-processing. The pre-processed or unprocessed data are transmitted via the Internet to a server and may be processed according to algorithms pertaining to object, movement, and pattern recognition, auto encoding, prediction and probability, data parsing, and feature extraction, for example. Generally, prediction and probability can provide for progressive machine learning pertaining to gesture recognition and sensor classification from captured multimedia.

For example, machine-learning algorithms may be implemented such as decision trees, Gaussian mixture models, support vectors, random forest, Naïve Bayes, K-means clustering and K-nearest neighbor, and hidden Markov models.

Figure 3:
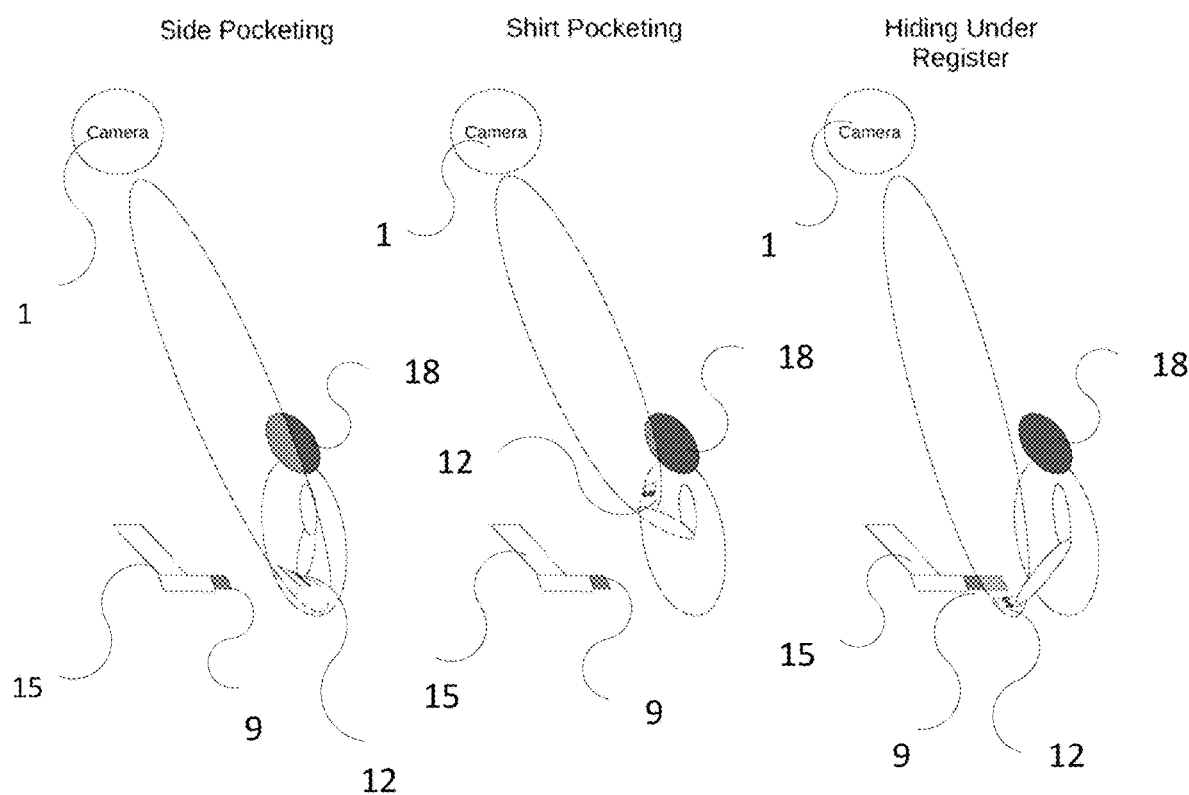
FIG. 3 shows a side view of exemplary gesture recognition abilities for suspicious gestures.
Figure 4:
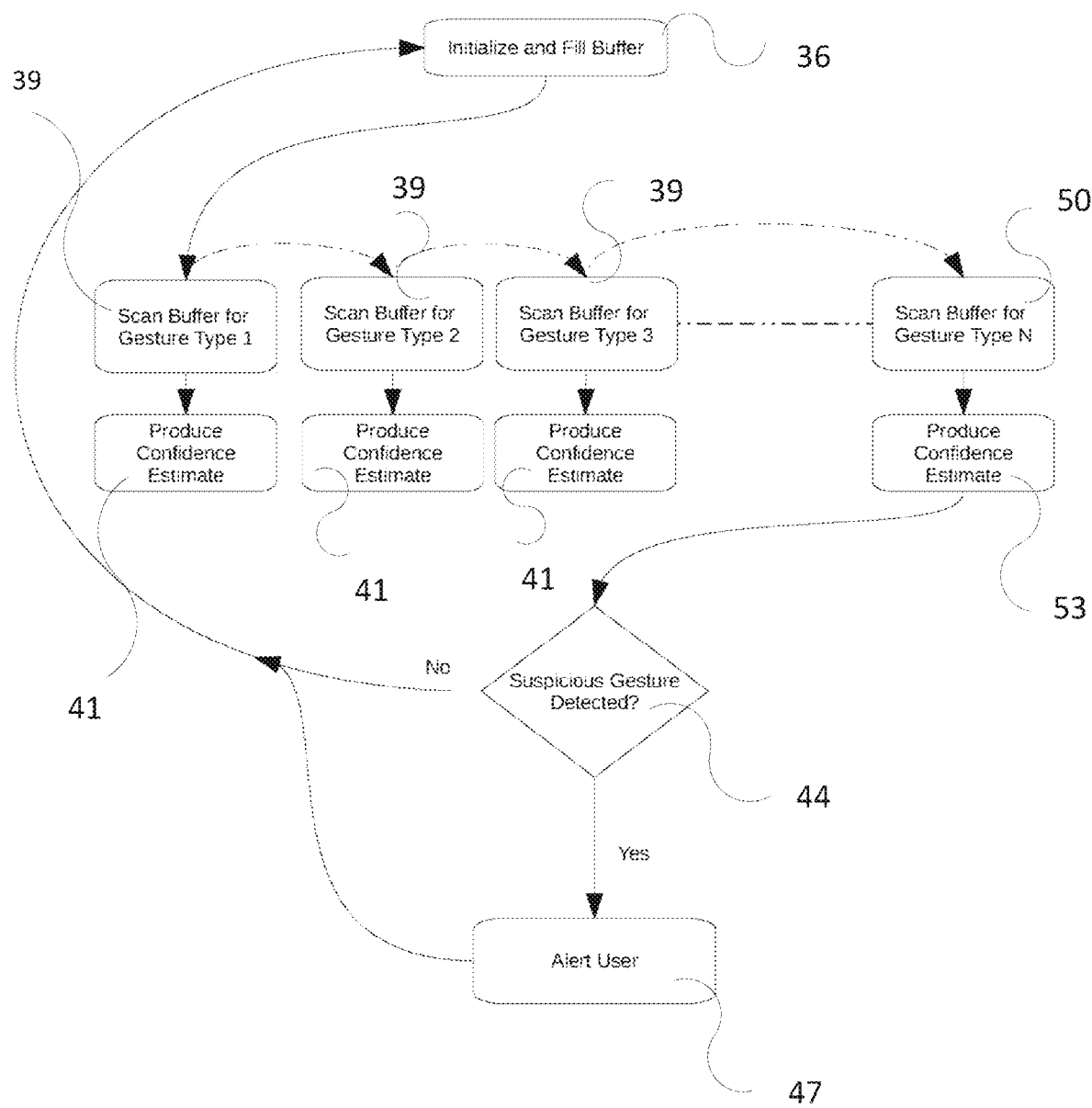
FIG. 4 shows a diagram of an exemplary suspicious gesture recognition algorithmic process.
Figure 5:
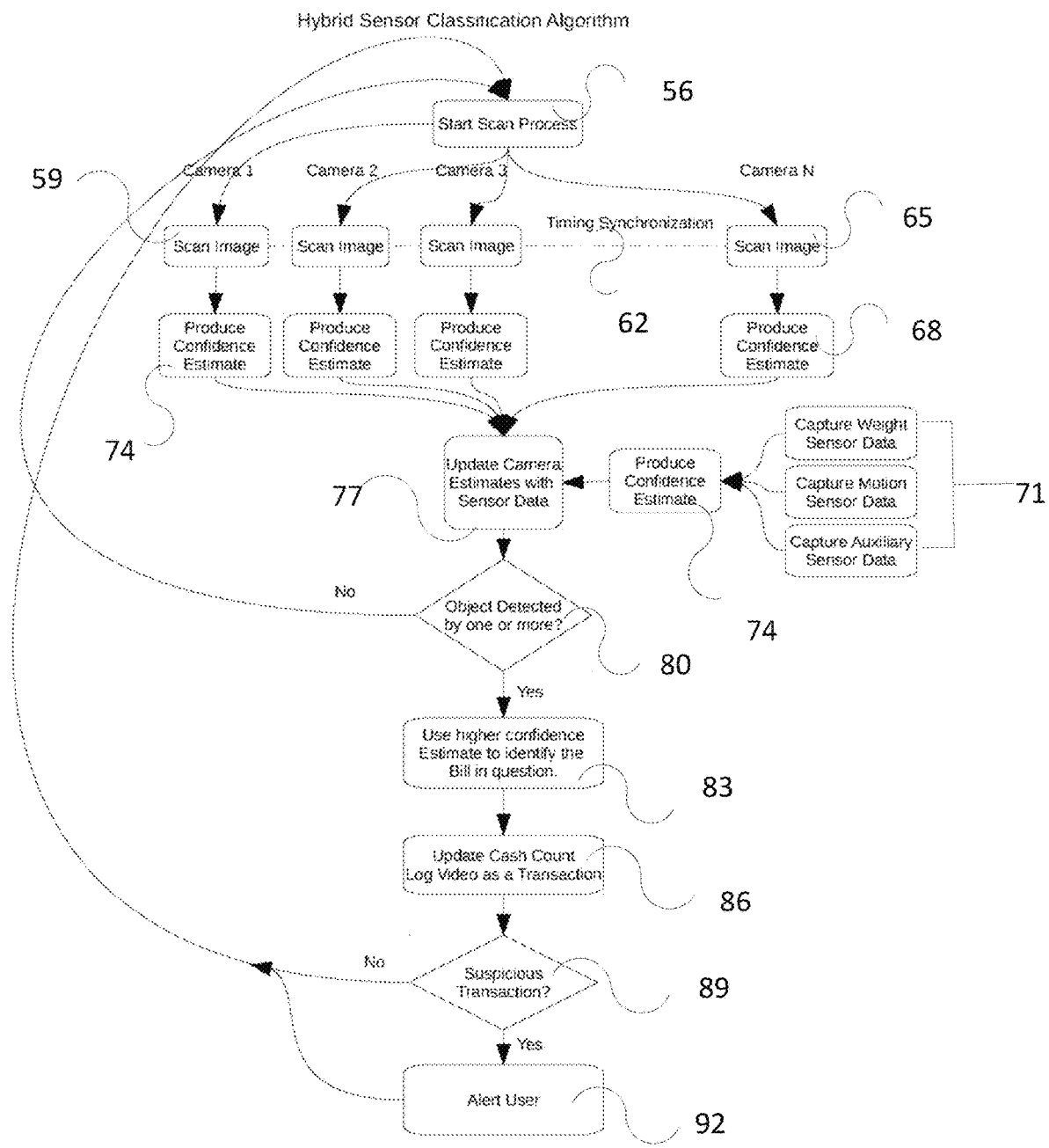
FIG. 5 shows a diagram of an exemplary hybrid sensor classification algorithmic process.

FIGS. 4 and 5 further explain exemplary algorithms and process flows that may apply to the system. Overall, the algorithm implemented in the system serve to detect anomalies in human behavior within the target area and with regard to target items of interest in order to predict a possible theft or misappropriation of those items of interest. Exemplary anomalies, suspicious gestures, are further explained in FIG. 3.

End users such as business owners who prefer to passively monitor a target area may access captured multimedia content and may access alerts and notifications. End users may access content on a computer or portable electronic device coupled with at least random access memory, a processor, database storage, and an Internet connection. Content and notifications may be accessed via a software portal or program with a graphical user interface. Data may be housed in a cloud-based database or a database having physical solid-state or hard drive storage integrated with the end-user computing device or offsite.

The executed instructions cause a processor to perform these operations: identify premises context for a defined area based at least in part on items, individuals, or parameters identified or obtained from a media capture device with or without sensors. The premises context can be defined by the identification of boundaries of a premise such as a room, the location of furniture or objects such as a countertop and a cash register, the presence of individuals, and the gestures of individuals. Suspicious gestures trigger an anomaly detection by the system. The system algorithm as explained in more detail in FIG. 5 interprets the anomaly to execute an alert based on the context of the suspicious gesture of an individual in connection with the handling of items in defined premise.

Computer systems may include tangible or non-transitory computer-readable storage devices or memory for carrying or having computer-executable instructions or data structures stored thereon. Tangible computer-readable storage devices may be any available device that can be accessed by a general purpose or special purpose computer, including the functional design of any processor. For example, tangible computer-readable devices may include SSD, RAM, ROM, EEPROM, CD-ROM or other optical disk storage, magnetic disk storage or other magnetic storage devices, or any other device which can be used to carry or store desired program code in the form of computer-executable instructions, data structures, or processor chip design, the connection as a computer-readable medium.

Computer-executable instructions include instructions, such as the algorithms, processes, and data further explained in FIGS. 4 and 5, which cause any device, computer, or special purpose processing device to perform a certain function or group of functions. Computer-executable instructions, associated data structures, and platform modules represent examples of the platform software code for executing steps of the methods disclosed herein. The particular sequence of such executable instructions or associated data structures represents examples of corresponding acts for implementing the functions described in such steps.

Regarding databases, database architectures such as column-oriented databases, in-memory databases, clustered databases, distributed databases, or even flat file data repositories may be used according to the disclosure. Any combination of known or future database technologies may be used as appropriate.

Regarding processors, a central processing unit may include one or more processors such as, for example, a microcontroller, a microcomputer, a programmable logic controller, an application-specific integrated circuit, and any other programmable circuit.

Software can include, but is not limited to, device drivers, firmware, operating systems, development tools, and applications software. Computer code devices of the exemplary embodiments of the disclosure may include any suitable interpretable or executable code mechanism, including but not limited to scripts, interpretable programs, dynamic link libraries (DLLs), Java classes and applets, complete executable programs.

General computer hardware and software architectures are referenced. Nevertheless, at least some of the features or functionalities of the various embodiments disclosed herein may be implemented on one or more devices such as general-purpose computers or media capture devices associated with one or more networks, such as for example an end-user or premises computer system, a client computer or point-of-sale system, a network server or other server system, a mobile computing device (tablet, wearable, mobile phone, smartphone, laptop), a consumer electronic device, or any other suitable electronic device, router, switch, or other suitable device, or any combination thereof. At least some of the features or functionalities of the exemplary systems disclosed herein may be implemented in one or more virtualized computing environments such as network computing clouds, virtual machines hosted on one or more physical computing machines, or other appropriate virtual environments.

Referring to FIG. 3, exemplary gesture recognition abilities are illustrated. Anomalies such as suspicious gestures may be detected according to data processing with gesture recognition and sensor classification algorithms as further presented in FIGS. 4 and 5. Human interaction with target items in a target area are tracked and recorded. The system algorithms may be programmed to initiate an alert or notification when a suspicious or atypical movement or gesture or physical anomaly occurs. For example, a target area may be a cash register counter at a gas station convenience store. The target items are the currency inside the cash register. The employee working the cash register is expected to insert and remove currency according to purchases made and change tendered. However, some employees may be tempted to slip a currency bill or coins into his/her pocket instead of placing the currency in the cash register. Such movements may not be detected with traditional surveillance cameras.

The system cameras with sensors placed, typically orthogonally from the target area, and with additional cameras and sensors will provide for more accurate and precise detection. The suspicious behavior as determined by the algorithms will initiate an alert or notification to the end user. This prevents an end-user from having to constantly monitor video footage from traditional surveillance systems. Anomaly detection is achieved on a micro scale and specific to changes in human behavior within a target area's context.

Sensors for movement, direction, mass, and volume may be used in connection with counters, timers, scanners, laser or infrared detectors, open-close or unlock-lock sensors to capture data. Increased data provides for more accurate context and progressively reduces the instances of false notifications. For example, scanners and counters can be used to read and count the amount of currency in a cash register at a given time. Open-close sensors and timers may indicate instances of when the cash register is accessed and for how long. Laser or infrared detectors may monitor every time an employee places his/her hand underneath the counter. Velocity sensors may identify hand movements that are irregularly or suspiciously fast or slow or hand placement relative to the employee's body such as in a shirt or side pocket.

Referring now to FIG. 4, an exemplary gesture recognition algorithmic process is illustrated. Gestures, and specifically suspicious gestures, are captured on the cameras and sensors, and then processed and recognized with a suspicious gesture recognition algorithm. Captured multimedia content is buffered and scanned for pre-determined gesture parameters. The data according to the parameters is analyzed to produce a confidence estimate or interval for determining the probability a recorded gesture is a suspicious gesture. If the parameters are met, then the end user will be notified.

A notification may include the multimedia details such as date and time, the applicable multimedia clip showing the suspicious gesture, and that the suspicious gesture is that was detected. Multiple gesture types and their respective parameters may be pre-programmed and calibrated according to gesture standards, and the parameters may change according to machine learning. The end-user may provide notification feedback pertaining to the accuracy of the gesture detected and whether the gesture is a suspicious gesture. Gesture parameters may be manually adjusted or added or may be progressively adjusted according to machine-learning algorithms and increased data capture and processing. Progressively, the system accuracy and precision improve.

In some embodiments, set parameters of known and baseline image scans is used for system configuration and calibration. Unknown multimedia presently being captured is also scanned and buffered to produce a confidence estimate in light of the set parameters for various gestures. The suspicious gesture recognition algorithm determines if a suspicious gesture is detected. If so, then a user is alerted of a possible theft. If not, then the system cycles to the initialization and fill buffer step.

Referring now to FIG. 5, an exemplary sensor classification algorithmic process is illustrated. Algorithmic processes may be executed simultaneously or sequentially during multimedia processing. In some embodiments, a sensor and camera may be used for capturing multimedia and parameter data for detecting suspicious gestures or anomalies. Multiple scans may be performed on the same multimedia file as well. Generally, the multimedia data file is scanned and synchronized across multiple cameras and sensors. According to parameters, the data are analyzed to produce a confidence interval to indicate the probability of an anomaly or suspicious behavior.

In addition, sensor data such as weight and motion are also analyzed to produce a confidence interval. The confidence intervals from both the sensor data and the camera multimedia data are co-analyzed for greater context and accuracy. This results in the production of machine-learning training data. A composite confidence interval is then determined. If a target item or object is detected within or outside a target area, then a second level of processing is performed with a greater confidence interval to identify more specific details such as the type of currency and amount present. A change or exchange of currency from a cash register may be identified and logged as a transaction or activity of potential interest, a trigger.

Further context and accuracy may be achieved with the inclusion of data from cash register open-close sensors. Once a transaction of interest or a suspicious gesture is detected, gesture-recognition algorithms may be executed to determine the probability or instance of a suspicious gesture during a certain time frame of a transaction of interest. If a suspicious gesture is detected, then the end-user will be notified.

In some embodiments, data from the multimedia capture device is scanned and processed. Reference data from multiple image capture devices may be analyzed and timing synchronized. Data from a camera N or unknown gesture multimedia capture source may also be obtained and analyzed. Images from the multimedia are scanned, and a confidence estimate is produced. The multimedia capture device and sensor data are progressively updated. Sensor data may be obtained from capturing parameters such as for weight, motion, velocity, light, and temperature for example. The sensors may be integrated in with the multimedia capture device such as a camera or may be a separate sensor device. Target object detection is analyzed between multiple multimedia capture sources. A higher confidence estimate results in the identification of the target object such as currency from a cash register at a workstation and within a target area. The target area may be variable and may be tracked by multimedia capture devices. The algorithm will promote the processing of an updated target object count based on multimedia captured during a video log for example and compared to the context and activities from a previous video log. The algorithm promotes the determination of a suspicious gesture or transaction. If so, a user is alerted. If not, the algorithm process starts over.

CONCLUSION

A number of embodiments of the present disclosure have been described. While this specification contains many specific implementation details, this specification should not be construed as limitations on the scope of any disclosures or of what may be claimed. The specification presents descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. A system for theft prevention and detection, the system comprising
   a. a plurality of media capture devices capable of capturing multimedia from an individual activity at a work station and wherein the media capture devices are positioned on a premises boundary orthogonally or perpendicularly to the work station and wherein the media capture devices have a field of view of a target area comprising a counter and a cash register, and wherein the media capture devices have a field of view of head, arms, and hands of the individual interacting with the counter and cash register in the target area;
   b. A plurality of sensors positioned on the premises boundary orthogonally or perpendicularly to the work station wherein the sensors are capable of capturing parameter data consisting of object weight, individual motion, object identification, individual velocity, light, and temperature of the target area;
   c. A computer hardware architecture in wireless communication with the plurality of media capture devices and the plurality of sensors, the computer hardware architecture comprising a non-transitory computer readable storage medium having computer readable program code embodied therewith, the computer readable program code comprising computer readable program code for receiving, scanning, and processing data from the plurality of media capture devices and sensors, analyzing target object detection from data obtained by the plurality of media capture devices, and producing composite confidence estimates based on the sensor parameters to identify an instance of theft or misappropriation; and
   d. operably configured code for a suspicious gesture recognition algorithm or for a hybrid sensor classification algorithm for detecting an instance of a theft or misappropriation wherein the sensor classification algorithm promotes processing of an updated target object count based on media captured during a video log, and wherein the suspicious gesture recognition algorithm promotes determination of a suspicious gesture or transaction by programmatically comparing context and an individual movement activities from a previous video log where the individual interacts with the counter and the cash register in the target area workstation;
   wherein the computer readable program code for scanning initiates a scan process of a received plurality scan images from the plurality of media capture devices, synchronizes timing of the plurality of scan images from each of the plurality of media capture devices to produce a single composite scan image and produces a confidence estimate from the plurality of sensor data, updates the plurality of media capture device data with the confidence estimate of the plurality of sensor data and enhances the confidence estimate from multiple target object detection
   wherein the composite confidence estimates are obtained through two rounds of processing of gesture data and object data from the plurality of media capture devices and sensors to indicate probability of a theft or misappropriation in real time by identifying individual gesture types of side pocketing, shirt pocketing, or hiding under the cash register.

* * * * *